(12) United States Patent
Gole et al.

(10) Patent No.: US 7,716,323 B2
(45) Date of Patent: *May 11, 2010

(54) SYSTEM AND METHOD FOR RELIABLE PEER COMMUNICATION IN A CLUSTERED STORAGE SYSTEM

(75) Inventors: Abhijeet Gole, Campbell, CA (US); Joydeep sen Sarma, Mountainview, CA (US)

(73) Assignee: NetApp, Inc., Sunnyvale, CA (US)

( * ) Notice: Subject to any disclaimer, the term of this patent is extended or adjusted under 35 U.S.C. 154(b) by 1296 days.

This patent is subject to a terminal disclaimer.

(21) Appl. No.: 10/622,558

(22) Filed: Jul. 18, 2003

(65) Prior Publication Data

US 2005/0015460 A1    Jan. 20, 2005

(51) Int. Cl.
G06F 15/173    (2006.01)
(52) U.S. Cl. .................. 709/224; 370/214; 370/400; 370/464; 370/471; 710/38; 711/162
(58) Field of Classification Search ................ 709/224; 370/214, 400, 464, 471; 710/38; 711/162
See application file for complete search history.

(56) References Cited

U.S. PATENT DOCUMENTS

| | | | |
|---|---|---|---|
| 4,937,763 A | 6/1990 | Mott | |
| 5,067,099 A | 11/1991 | McCown et al. | |
| 5,157,663 A | 10/1992 | Major et al. | |
| 5,163,131 A | 11/1992 | Row et al. | |
| 5,355,453 A | 10/1994 | Row et al. | |
| 5,485,579 A | 1/1996 | Hitz et al. | |
| 5,633,999 A | 5/1997 | Clowes et al. | |
| 5,680,580 A * | 10/1997 | Beardsley et al. | 714/6 |
| 5,781,770 A | 7/1998 | Byers et al. | |
| 5,802,366 A | 9/1998 | Row et al. | |
| 5,812,748 A | 9/1998 | Ohran et al. | |
| 5,812,751 A | 9/1998 | Ekrot et al. | |
| 5,819,292 A | 10/1998 | Hitz et al. | |
| 5,887,134 A * | 3/1999 | Ebrahim | 709/200 |
| 5,931,918 A | 8/1999 | Row et al. | |

(Continued)

FOREIGN PATENT DOCUMENTS

WO    WO-99/59064 A1    11/1999

(Continued)

OTHER PUBLICATIONS

European Search Report for Application No. EP 01 01 6755, Nov. 8, 2004 pp. 1-3.

(Continued)

*Primary Examiner*—Thu Nguyen
*Assistant Examiner*—Tauqir Hussain
(74) *Attorney, Agent, or Firm*—Cesari and McKenna, LLP

(57) ABSTRACT

A system and method for reliable peer-to-peer communication is provided. The system and method includes a cluster connection manager that acts as a unified resource for opening, closing and maintaining peer-to-peer communication channels between applications executing on storage systems comprising a storage system cluster. The cluster connection manager communicates with cluster connection manager clients to maintain and manage the communication channels. The cluster connection manager may also be operatively interconnected with a plurality of cluster interconnect devices, thereby enabling failover operation in the event that a cluster interconnect device suffers an error condition.

10 Claims, 9 Drawing Sheets

U.S. PATENT DOCUMENTS

| | | | |
|---|---|---|---|
| 5,941,972 | A | 8/1999 | Hoese et al. |
| 5,948,110 | A | 9/1999 | Hitz et al. |
| 5,950,225 | A | 9/1999 | Kleiman et al. |
| 5,951,695 | A | 9/1999 | Kolovson |
| 5,963,962 | A | 10/1999 | Hitz et al. |
| 5,964,886 | A | 10/1999 | Slaughter et al. |
| 5,991,797 | A * | 11/1999 | Futral et al. ............... 709/216 |
| 6,014,669 | A * | 1/2000 | Slaughter et al. ............ 707/10 |
| 6,038,570 | A | 3/2000 | Hitz et al. |
| 6,065,037 | A | 5/2000 | Hitz et al. |
| 6,119,244 | A | 9/2000 | Schoenthal et al. |
| 6,138,126 | A | 10/2000 | Hitz et al. |
| 6,161,191 | A | 12/2000 | Slaughter et al. |
| 6,173,413 | B1 | 1/2001 | Slaughter et al. |
| 6,289,356 | B1 | 9/2001 | Hitz et al. |
| 6,292,905 | B1 | 9/2001 | Wallach et al. |
| 6,421,787 | B1 | 7/2002 | Slaughter et al. |
| 6,425,035 | B2 | 7/2002 | Hoese et al. |
| 6,438,705 | B1 * | 8/2002 | Chao et al. ................... 714/4 |
| 6,542,924 | B1 | 4/2003 | Abe |
| 6,625,749 | B1 | 9/2003 | Quach |
| 6,675,200 | B1 * | 1/2004 | Cheriton et al. ............ 709/212 |
| 6,721,806 | B2 * | 4/2004 | Boyd et al. ................. 719/312 |
| 6,728,897 | B1 | 4/2004 | Cramer et al. |
| 6,742,051 | B1 | 5/2004 | Bakshi et al. |
| 6,747,949 | B1 | 6/2004 | Futral |
| 6,760,304 | B2 | 7/2004 | Uzrad-Nali et al. |
| 6,888,792 | B2 | 5/2005 | Gronke |
| 6,920,579 | B1 | 7/2005 | Cramer et al. |
| 6,952,792 | B2 * | 10/2005 | Emberty et al. ................ 714/5 |
| 7,099,337 | B2 * | 8/2006 | Pinto ......................... 370/400 |
| 7,103,888 | B1 | 9/2006 | Cayton et al. |
| 7,171,476 | B2 * | 1/2007 | Maeda et al. .............. 709/227 |
| 7,203,730 | B1 * | 4/2007 | Meyer et al. ............... 709/213 |
| 2002/0071386 | A1 * | 6/2002 | Gronke ...................... 370/217 |
| 2002/0114341 | A1 * | 8/2002 | Sutherland et al. .......... 370/428 |
| 2003/0061296 | A1 * | 3/2003 | Craddock et al. ........... 709/212 |
| 2003/0078946 | A1 * | 4/2003 | Costello et al. ............. 707/201 |
| 2003/0088638 | A1 | 5/2003 | Gluck et al. |
| 2003/0115350 | A1 | 6/2003 | Uzrad-Nali et al. |
| 2004/0010545 | A1 | 1/2004 | Pandya |
| 2004/0019821 | A1 * | 1/2004 | Chu et al. ....................... 714/6 |
| 2004/0030668 | A1 | 2/2004 | Pawlowski et al. |
| 2004/0037319 | A1 | 2/2004 | Pandya |
| 2004/0049600 | A1 * | 3/2004 | Boyd et al. ................. 709/250 |
| 2004/0064815 | A1 * | 4/2004 | Uzrad-Nali et al. ......... 718/102 |
| 2004/0156393 | A1 | 8/2004 | Gupta et al. |
| 2004/0174814 | A1 | 9/2004 | Futral |
| 2004/0268017 | A1 | 12/2004 | Uzrad-Nali et al. |

FOREIGN PATENT DOCUMENTS

WO     WO 01/35244 A1     5/2001

OTHER PUBLICATIONS

David Hitz et al. TR3002 File System Design for a NFS File Server Appliance published by Network Appliance, Inc.

Fielding et al. (1999) Request for Comments (RFC) 2616, HTTP/1.1.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

NCI TS 332-1999 Fibre Channel Arbitrated Loop (FC-AL-2) published by the American National Standards Institute.

Virtual Interface Architecture Specification, Version 1.0, published by a collaboration between Compaq Computer Corp., Intel Corp., and Microsoft Corp.

"Predefined"—definition from dictionary.com, Webster's Revised Unabridged Dictionary © 1996, 1998 MICRA, Inc. <http://dictionary.reference.com/browse/predefine>.

* cited by examiner

SYSTEM AND METHOD FOR RELIABLE PEER COMMUNICATION IN A CLUSTERED STORAGE SYSTEM

RELATED APPLICATION

This application is related to United States Patent Publication Number (2005/0015459), entitled SYSTEM AND METHOD FOR ESTABLISHING A PEER CONNECTION USING RELIABLE RDMA PRIMITIVES, by Abhijeet Gole, et al., the contents of which are herein incorporated by reference.

FIELD OF THE INVENTION

The present invention relates to clustered storage systems and, in particular, to managing reliable communications between cluster partners in a clustered storage system.

BACKGROUND OF THE INVENTION

A storage system is a computer that provides storage service relating to the organization of information on writeable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of semantic level of access to files and file systems. Storage of information on a NAS system is typically deployed over a computer network comprising a geographically distributed collection of interconnected communication links, such as Ethernet, that allow clients to remotely access the information (files) on the file server. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (FCP) or TCP/IP/Ethernet (iSCSI). A SAN arrangement or deployment allows decoupling of storage from the storage system, such as an application server, and some level of storage sharing at the application server level. There are, however, environments wherein a SAN is dedicated to a single server.

It is advantageous for the services and data provided by a storage system to be available for access to the greatest degree possible. Accordingly, some computer systems provide a plurality of storage systems organized in a cluster, with a property that when a first storage system fails, a second storage system is available to take over and provide the services and the data otherwise served by the first storage system. In particular, when the first storage system fails, the second storage system in the cluster assumes the tasks of processing and handling any data access requests normally processed by the first storage system. One such example of a cluster configuration is described in U.S. patent application Ser. No. 09/625,234 entitled NEGOTIATING TAKEOVER IN HIGH AVAILABILITY CLUSTER by Samuel M. Cramer, et al., the contents of which are hereby incorporated by reference.

In a typical cluster environment, there may be several processes executing on each storage system ("cluster partner") that desire to communicate with corresponding "peer" processes executing on the other storage system partner in the cluster. One exemplary process is a cluster failover (CFO) monitoring process that determines if a cluster partner has failed and whether a takeover operation of the storage (e.g., disks) served by the failed storage system should be initiated. To that end, the CFO monitoring process sends routine "heartbeat" signals to its corresponding CFO monitoring process to alert the cluster partner that its other partner is operating without any serious errors that would necessitate a failover.

Typically, each of these peer processes utilizes its own protocol implementation for opening, closing, and managing network data connections to its corresponding peer process. However, this results in inefficient duplication of protocol or communication management routines. In addition, such duplication may increase the difficulty of coordinating information between peer processes on cluster partners in the event of loss of a communication medium (e.g., a cluster interconnect) coupling the partners. Specifically, in the event of a failure of the cluster interconnect, the various processes lose their capability to provide peer-to-peer communication with their respective cluster partner peer processes. This lack of communication adversely affects the cluster by preventing the cluster partners from coordinating state and other configuration information between them. For example, data loss may occur as synchronization with respect to a non-volatile random access memory (NVRAM) shadowing process executing on the partner is disrupted.

As noted each peer process typically creates and manages its own peer connection with its corresponding peer process on a cluster partner. The handshaking and capabilities exchange among processes needed to create and manage the peer connection are performed in accordance with a conventional protocol implementation, such as the Virtual Interface (VI) protocol. The VI protocol is typically implemented by a VI layer of a storage operating system executing on each storage system of the cluster. However, a peer process may not begin communicating with its corresponding peer process on the cluster partner until the VI layer has been loaded during a boot sequence of the storage system, which may consume a substantial amount of time. By requiring a peer process, such as the CFO monitoring process, to wait until the VI layer of the storage operating system has been loaded and executed, significant amounts of time may pass and unnecessary failover operations may occur, especially when a storage system suffers a minor transient error condition. Cluster performance requires peer processes to be in communication with their corresponding peer process on the cluster partner as soon as possible during the boot sequence.

Another disadvantage of a conventional cluster environment is the inability to balance communication "loads" among peer processes executing on the cluster partner. In the conventional cluster environment, all peer-to-peer communications typically occur over a single cluster interconnect. Certain peer processes may consume inordinate amounts of bandwidth available over a given cluster interconnection, thereby reducing the bandwidth available for other peer processes. For example, the NVRAM shadowing process may, during periods of heavy loads, consume a substantial amount of the cluster interconnect bandwidth. The present invention is directed, in part, to providing a technique for balancing loads transferred between processes of a cluster environment.

SUMMARY OF THE INVENTION

The present invention overcomes the disadvantages of the prior art by providing a technique for reliable and unified peer-to-peer communication among storage system "partners" in a cluster environment. A cluster connection manager is provided to reliably create virtual interface (VI) connections between peer processes executing on the storage system partners over a cluster interconnect without requiring a storage operating system executing on each storage system to be fully active or functioning. The peer process of each storage system functions as a "cluster connection clients" that requests the services of the cluster connection manager to establish and maintain VI connections with its peer of a cluster partner. The cluster connection manager thus acts as a subsystem of the storage operating system for managing the plurality of peer-to-peer connections that exist in a cluster system among the various cluster communication manager clients. Additionally, the cluster connection manager monitors the status of the cluster interconnect to ensure proper operation. In the event of an error condition, the cluster connection manager alerts the cluster connection manager clients of the error condition and attempts to resolve the error condition. Once a connection is established, the cluster connection manager contacts the various cluster connection manager clients to instruct them to proceed to create appropriate VIs and connect to the created VIs. The cluster connection manager clients then create the necessary VIs using conventional techniques.

In an alternate embodiment, each storage system may include a plurality of cluster interconnect managers, each associated with a cluster interconnect and cluster interconnect adapter for use in multipath, failover and/or load balancing situations. The use of plural managers/interconnects/adapters facilitates a failover operation from a failed cluster interconnect to an operable one to thereby maintain peer-to-peer communication between the cluster partner storage systems. Additionally, a cluster connection manager may distribute clients (and their loads) among a plurality of cluster interconnects so as to optimize performance. By distributing clients among a plurality of cluster connection managers, a plurality of cluster interconnects and adapters may be used to implement load balancing techniques and fault tolerant techniques to thereby improve system performance.

BRIEF DESCRIPTION OF THE DRAWINGS

The above and further advantages of the invention may be understood by referring to the following description in conjunction with the accompanying drawings in which like reference numerals indicate identical or functionally similar elements.

DETAILED DESCRIPTION OF ILLUSTRATIVE EMBODIMENTS

A. Cluster Environment

Figure 1:
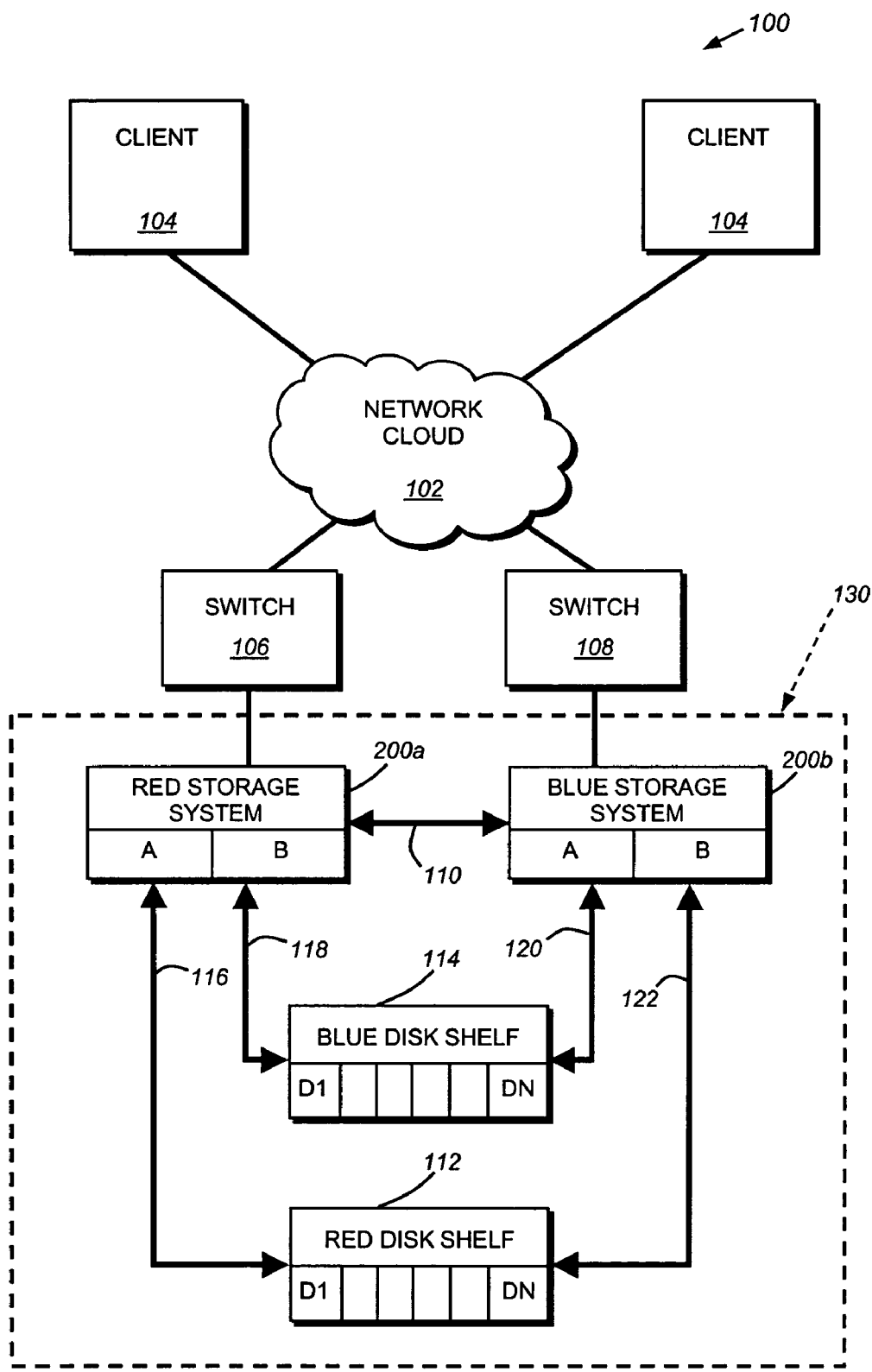
FIG. 1 is a schematic block diagram of an exemplary network environment having storage systems in a storage system cluster in accordance with an embodiment of the present invention.

FIG. 1 is a schematic block diagram of an exemplary network environment 100 in which the principles of the present invention are implemented. A network cloud 102 may comprise point-to-point links, wide area networks (WAN), virtual private networks (VPN) implemented over a public network (Internet) or a shared local area network (LAN) and/or any other acceptable networking architecture. However, in the illustrative embodiment, the network cloud 102 is configured as, e.g., a Fibre Channel (FC) switching network. FC is a set of related standards defining a transport service for a variety of data access protocols. Attached to the network cloud are clients 104 and intermediate network nodes, such as switches, 106 and 108, which connect to various storage systems, such as Red storage system 200a and Blue storage system 200b.

A client 104 may be a general-purpose computer, such as a PC, a workstation or a special-purpose computer, such as an application server, configured to execute applications over a variety of operating systems, including the UNIX® and Microsoft® Windows™ operating systems that support block access protocols. Red storage system 200a and Blue storage system 200b are connected as two nodes of a storage system cluster 130. These storage systems, described further below, are illustratively storage appliances configured to control storage of and access to, interconnected storage devices. Each system attached to the network cloud 102 includes an appropriate conventional network interface arrangement (not shown) for communicating over the network 102, or through the switches 106 and 108.

In the illustrated example, Red storage system is connected to Red Disk Shelf 112 by data access loop 116 (i.e., Red Disk Shelf's A port). It should be noted that such a data access loop can be any acceptable networking media including, for example, a Fibre Channel Arbitrated Loop (FC-AL). Similarly, the Red storage system accesses Blue Disk Shelf 114 via counterpart data access loop 118 (i.e., Blue Disk Shelf's B port). Likewise, Blue storage system accesses Blue Disk Shelf 114 via data access loop 120 (i.e., Blue Disk Shelf's A port) and Red Disk Shelf 112 through counterpart data access loop 122 (i.e., Red Disk Shelf's B port). It should be noted that the Red and Blue disk shelves are shown directly connected to storage systems 200 for illustrative purposes only. That is, the disk shelves and storage systems may be operatively interconnected via any suitable FC switching network topology. During normal cluster operation, the storage system that is connected to a disk shelf via the disk shelf's A loop is the "owner" of the disk shelf and is primarily responsible for servicing data requests directed to blocks on volumes contained on that disk shelf. Thus, the Red storage system owns Red Disk Shelf 112 and is primarily responsible for servicing data access requests for data contained on that disk shelf. Similarly, the Blue storage system is primarily responsible for the Blue disk shelf 114. When operating as a storage system cluster, each storage system is configured to take over and assume data handling capabilities for the other disk shelf in the cluster 130 via the disk shelf's B port.

Connecting the Red and Blue storage systems is a cluster interconnect 110, which provides a direct communication link between the two storage systems. The cluster interconnect can be of any suitable communication medium, including, for example, an Ethernet connection. However, in the illustrative embodiment, the cluster interconnect 110 comprises a Fibre Channel data path. In an alternate embodiment, the storage systems may be connected via a plurality of cluster interconnects. This plurality of cluster interconnects facilitates multi-path and/or failover operations in the event that one or more of the cluster interconnects fail during routine operation of the storage system cluster environment.

B. Storage Appliance

Figure 2:
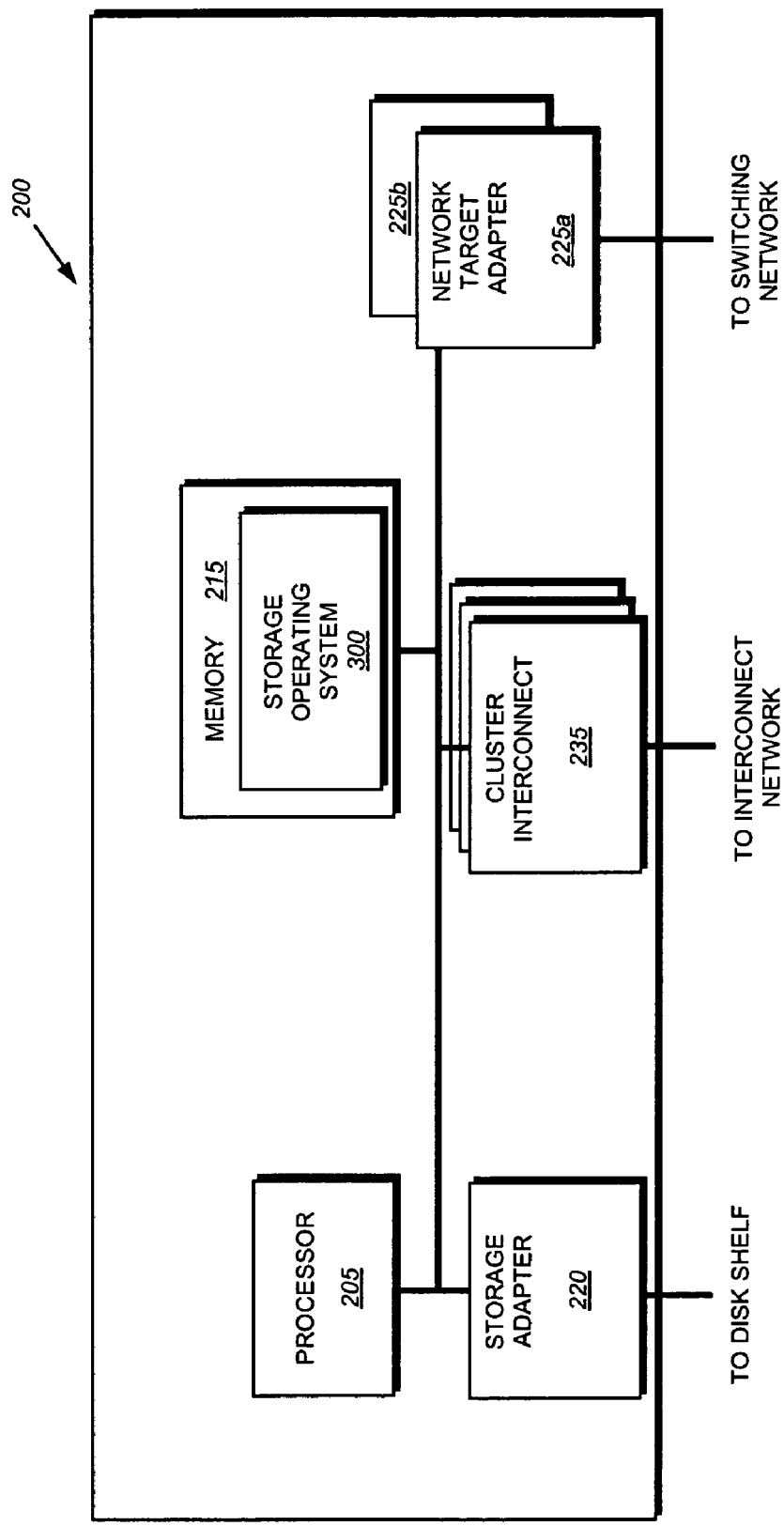
FIG. 2 is a schematic block diagram of an exemplary storage system in accordance with an embodiment of the present invention.

FIG. 2 is a schematic block diagram of an exemplary storage system 200 used in the cluster network environment 100 and configured to provide storage service relating to the organization of information on storage devices, such as disks. The storage system 200 is illustratively embodied as a storage appliance comprising a processor 205, a memory 215, a plurality of network adapters 225a, 225b and a storage adapter 220 interconnected by a system bus 230. The terms "storage system" and "storage appliance" are thus used interchangeably. The storage appliance 200 also includes a storage operating system 300 that logically organizes the information as a hierarchical structure of directories, files and virtual disks (vdisks) on the disks.

In the illustrative embodiment, the memory 215 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 300, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

Each network adapter 225a, b may comprise a network interface card (NIC) having the mechanical, electrical, and signaling circuitry needed to couple the storage appliance to the switch 106, 108. Each NIC may include an interface that is assigned one or more IP addresses along with one or more media access control (MAC) addresses. The clients 104 communicate with the storage appliance by sending packet requests for information to these addresses in accordance with a predefined protocol, such as TCP/IP.

The storage adapter 220 cooperates with the storage operating system 300 executing on the storage appliance to access information requested by the clients 104. The information may be stored on the disks or other similar media adapted to store information. The storage adapter includes input/output (I/O) interface circuitry that couples to the disks over an I/O interconnect arrangement, such as a conventional high-performance, FC serial link or loop topology. The information is retrieved by the storage adapter and, if necessary, processed by the processor 205 (or the adapter 220 itself) prior to being forwarded over the system bus 230 to the network adapters 225a and b, where the information is formatted into packets and returned to the clients.

Storage of information on the storage appliance 200 is, in the illustrative embodiment, implemented as one or more storage volumes that comprise a cluster of physical storage disks, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume is constructed from an array of physical disks that are organized as RAID groups. The physical disks of each RAID group include those disks configured to store striped data and parity for the data, in accordance with an illustrative RAID 4 level configuration. However, other RAID level configurations (e.g. RAID 5) are also contemplated. In the illustrative embodiment, a minimum of one parity disk and one data disk may be employed. Yet, a typical implementation may include three data and one parity disk per RAID group and at least one RAID group per volume.

To facilitate access to the disks, the storage operating system 300 implements a write-anywhere file system that logically organizes the information as a hierarchical structure of directory, file and vdisk objects (hereinafter "directories", "files" and "vdisks") on the disks. A vdisk is a special file type that is translated into an emulated disk or logical unit number (lun) as viewed by a storage are network (SAN) client. Each "on-disk" file may be implemented as set of disk blocks configured to store information, such as data, whereas the directory may be implemented as a specially formatted file in which names and links to other files and directories are stored.

Also connected to the system bus 230 is one or more cluster interconnect adapters 235. Each cluster interconnect adapter 235 provides a specific network interface over a cluster interconnect 110 to a cluster partner of the storage system for various partner-to-partner communications and applications. The cluster interconnect may utilize various forms of network transport media, including, for example, Ethernet or Fibre Channel links. A plurality of cluster interconnects and adapters may be utilized for load balancing, multi-path and fault tolerant configurations in the event that one or more of the cluster interconnects fail during operation of the storage systems.

C. Storage Operating System

In the illustrative embodiment, the storage operating system is the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
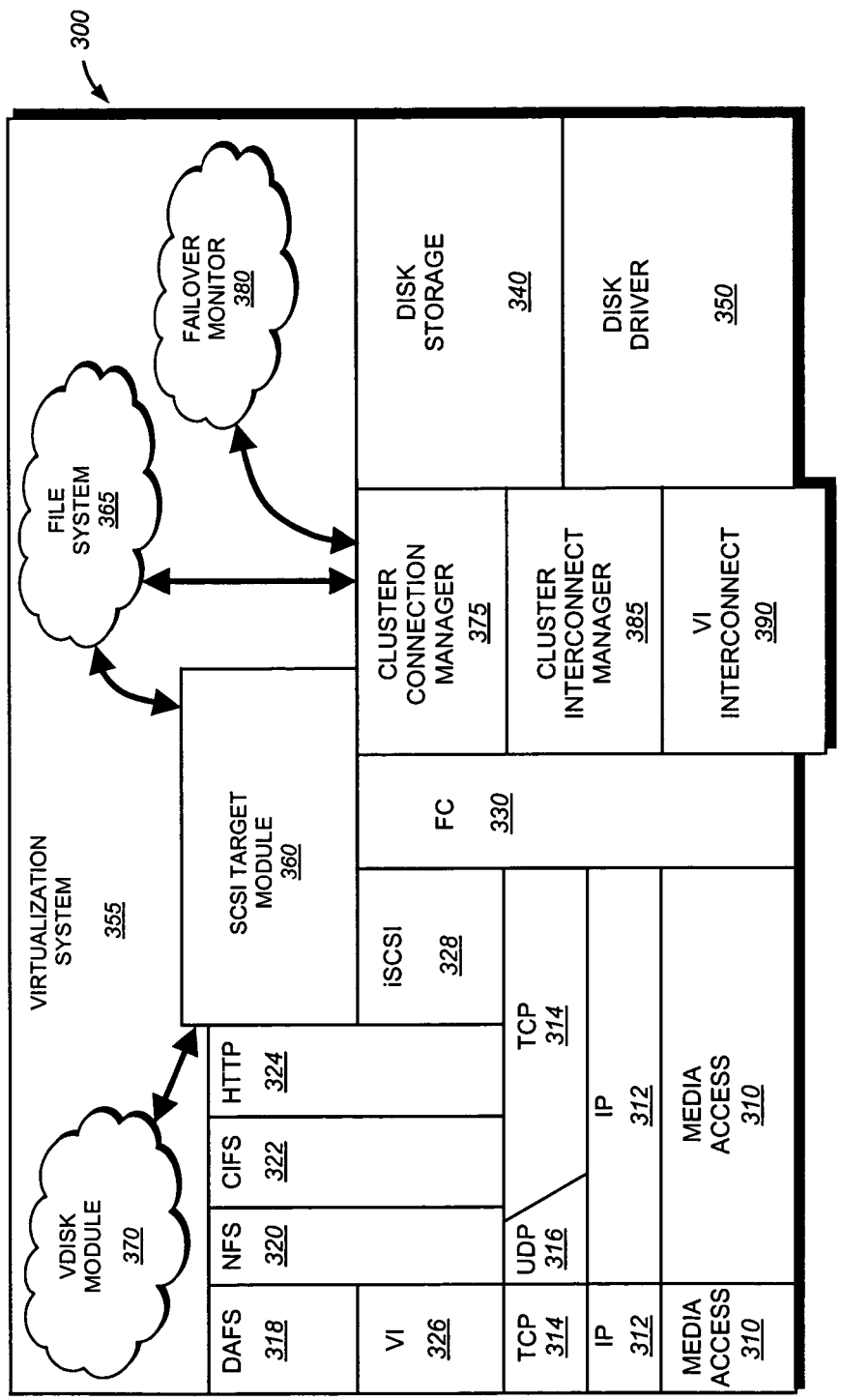
FIG. 3 is a schematic block diagram of an exemplary storage operating system executing on a storage system for use in accordance with an embodiment of the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine that provides data paths for clients to access information stored on the storage appliance using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the DAFS protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318.

An iSCSI driver layer 328 provides block protocol access over the TCP/IP network protocol layers, while a FC driver layer 330 operates with the FC HBA 326 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the storage appliance. In addition, the storage operating system includes a disk storage layer 340 that implements a disk storage protocol, such as a RAID protocol, and a disk driver layer 350 that implements a disk access protocol such as, e.g., a SCSI protocol.

Bridging the disk software layers with the integrated network protocol stack layers is a virtualization system 355 that is implemented by a file system 365 interacting with virtualization modules illustratively embodied as, e.g., vdisk module 370 and SCSI target module 360. It should be noted that the vdisk module 370, the file system and SCSI target module 360 can be implemented in software, hardware, firmware, or a combination thereof. The vdisk module 370 interacts with the file system 365 to enable access by administrative interfaces in response to a system administrator issuing commands to the multi-protocol storage appliance 300. In essence, the vdisk module 370 manages SAN deployments by, among other things, implementing a comprehensive set of vdisk (lun) commands issued through a user interface by a system administrator. These vdisk commands are converted to primitive file system operations ("primitives") that interact with the file system 365 and the SCSI target module 360 to implement the vdisks.

The SCSI target module 360, in turn, initiates emulation of a disk or lun by providing a mapping procedure that translates luns into the special vdisk file types. The SCSI target module is illustratively disposed between the FC and iSCSI drivers 328, 330 and the file system 365 to thereby provide a translation layer of the virtualization system 355 between the SAN block (lun) space and the file system space, where luns are represented as vdisks. By "disposing" SAN virtualization over the file system 365, the multi-protocol storage appliance reverses the approaches taken by prior systems to thereby provide a single unified storage platform for essentially all storage access protocols.

The file system 365 is illustratively a message-based system; as such, the SCSI target module 360 transposes a SCSI request into a message representing an operation directed to the file system. For example, the message generated by the SCSI target module may include a type of operation (e.g., read, write) along with a pathname (e.g., a path descriptor) and a filename (e.g., a special filename) of the vdisk object represented in the file system. The SCSI target module 360 passes the message into the file system 365 as, e.g., a function call, where the operation is performed.

The file system 365 illustratively implements the WAFL file system having an on-disk format representation that is block-based using, e.g., 4 kilobyte (KB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk. A description of the structure of the file system, including on-disk inodes and the inode file, is provided in U.S. Pat. No. 5,819,292, entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al., the contents of which are hereby incorporated by reference.

The storage operating system 300 further includes, in the illustrative embodiment, a cluster connection manager 375 embodied as hardware, software, firmware or a combination thereof that is configured to establish and maintain peer-to-peer connections between the storage system and its partner storage system to thereby provide a centralized peer-to-peer communication access point for connection manager clients.

A cluster connection client is illustratively a process, thread or program executing on the storage system that utilizes the services of the cluster connection manager to open and maintain communications with a cluster peer process. An exemplary connection manager client is a failover monitor 380 that implements various failover features, including, for example, initiating a failover in the event that the partner storage system fails or otherwise suffers a non-transient error condition. In alternate embodiments, the failover monitor 380 also interacts with the connection manager 375 to perform non-volatile random access memory (NVRAM) shadowing between the systems of cluster 130. An exemplary failover monitor implementation that may be advantageously used with the present invention is described in U.S. patent application Ser. No. 10/011,844, entitled EFFICIENT USE OF NVRAM DURING TAKEOVER IN A NODE CLUSTER, by Abhijeet Gole, et al., the contents of which are hereby incorporated by reference as though fully set forth herein. It should be noted that other connection manager clients may be utilized within storage operating system 300. The use of a failover monitor 380 as a cluster connection client is for exemplary purposes only. Other cluster connection clients 385 may interface with the cluster connection manager 375.

In alternate embodiments, a storage operating system may include a plurality of cluster connection managers 375. The plurality of cluster connection managers may be distributed among a plurality of cluster interconnect devices. Similarly, a plurality of connection manager clients may be distributed among the plurality of cluster connection managers. The use of such a plurality of cluster connection managers facilitates failover and/or load balancing operations.

D. Cluster Connection Manager Operations

In accordance with an illustrative embodiment of the present invention, the cluster connection manager 350 of the storage operating system 300 performs all peer-to-peer communications between the storage systems of cluster 130. To that end, a predetermined connection manager, e.g., the "initializing" cluster connection manager 375, initially creates a peer-to-peer connection with its "peer" cluster connection manager 375 (i.e., its cluster partner).

Figure 4:
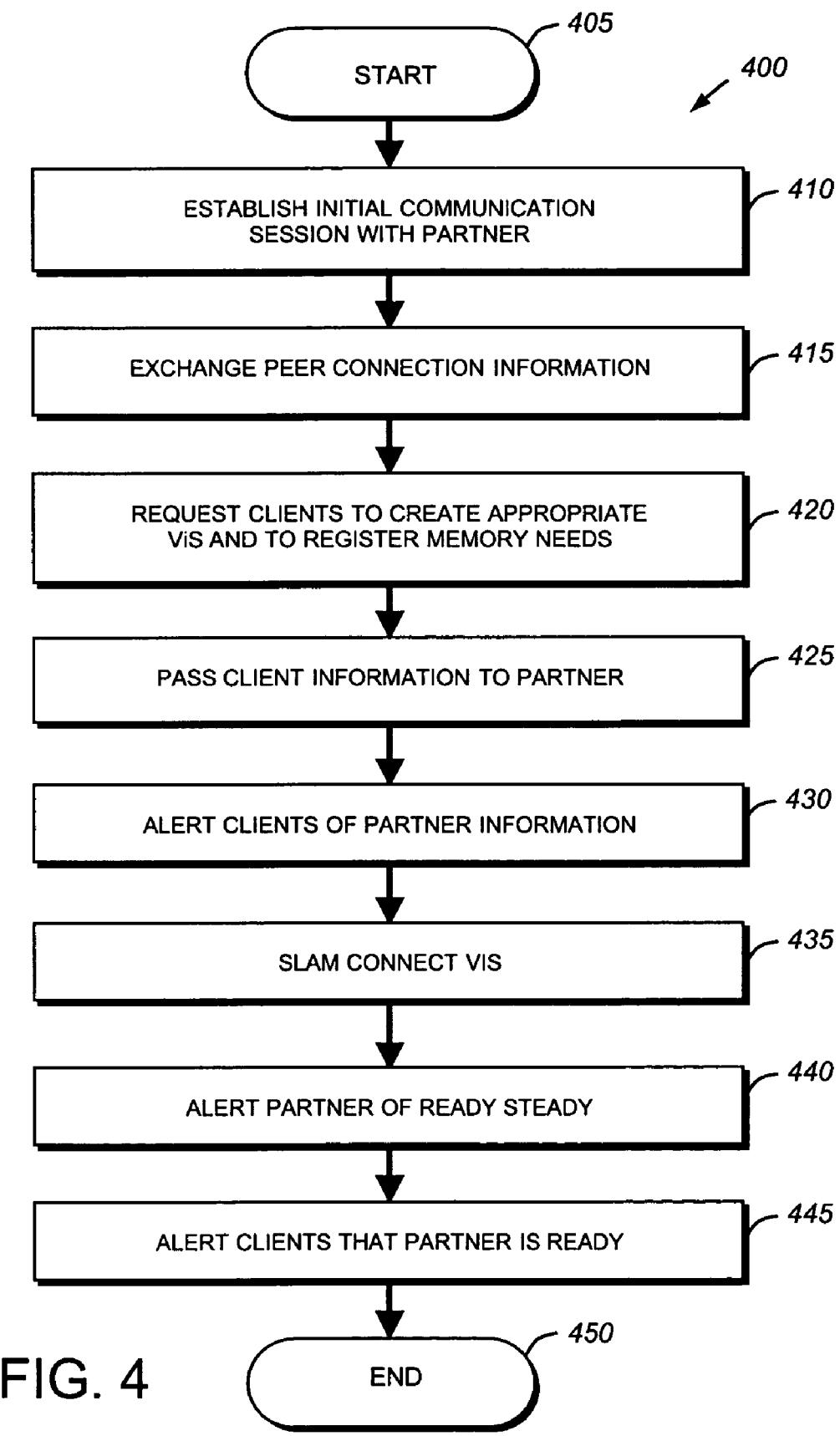
FIG. 4 is a flowchart detailing the steps of a procedure performed by a cluster connection manager during an initialization process in accordance with an embodiment of the present invention.

FIG. 4 is a flow chart of a sequence of steps 400 performed by the cluster connection managers during an initialization process. The sequence begins in step 405 and then proceeds to step 410 where the initiating cluster connection manager establishes an initial communication session with the partner. Establishment of the initial communication session may be accomplished using a variety of techniques; an example of a technique for establishing an initial communication session with a cluster partner that may be advantageously utilized herein is described in co-pending U.S. Patent Publication Number (2005/0015459), entitled SYSTEM AND METHOD FOR ESTABLISHING A PEER CONNECTION USING RELIABLE RDMA PRIMITIVES, by Abhijeet Gole, et al., the contents of which are hereby incorporated by reference. Once the initial communication session has been established, the cluster connection manager, in step 415, exchanges peer connection information. The peer connection information may include, for example, a version number of the cluster connection manager software, hardware memory region addresses and handles that are used by the cluster storage systems to directly access the memory region using RDMA operations over the cluster interconnect and/or other implementation specific data that may be required by the systems. Each storage system may utilize its partner data to ensure that, for example, the partner is executing a version of the connection manager that is compatible with its own connection manager implementation.

In step 420, the cluster connection manager requests that its clients create appropriate virtual interfaces (VIs) and register any memory requirements. As noted above, the clients may communicate with the cluster connection manager via an API or other IPC techniques. Once the clients have created the appropriate VIs and registered the memory needs, the cluster connection manager in step 425, passes that client information to the cluster partner storage system. The peer cluster connection manager of the cluster partner alerts its clients of the received partner information in step 430. The cluster connection manager then "slam connects" the appropriate VIs in step 435 and alerts the storage system cluster partner of its ready status in step 440. By "slam connect" it is meant that the VI is connected by utilizing a supplied VI number directed to a known network address without the conventional connect request and response messages defined in the VI specification. These VIs may be slam connected using the partner information obtained in step 430 above. Once the cluster connection manager has received notice that its partner has sent a ready status indicator, it alerts the cluster connection clients, in step 445, that the partner is ready to begin processing messages over the VIs created.

Figure 5:
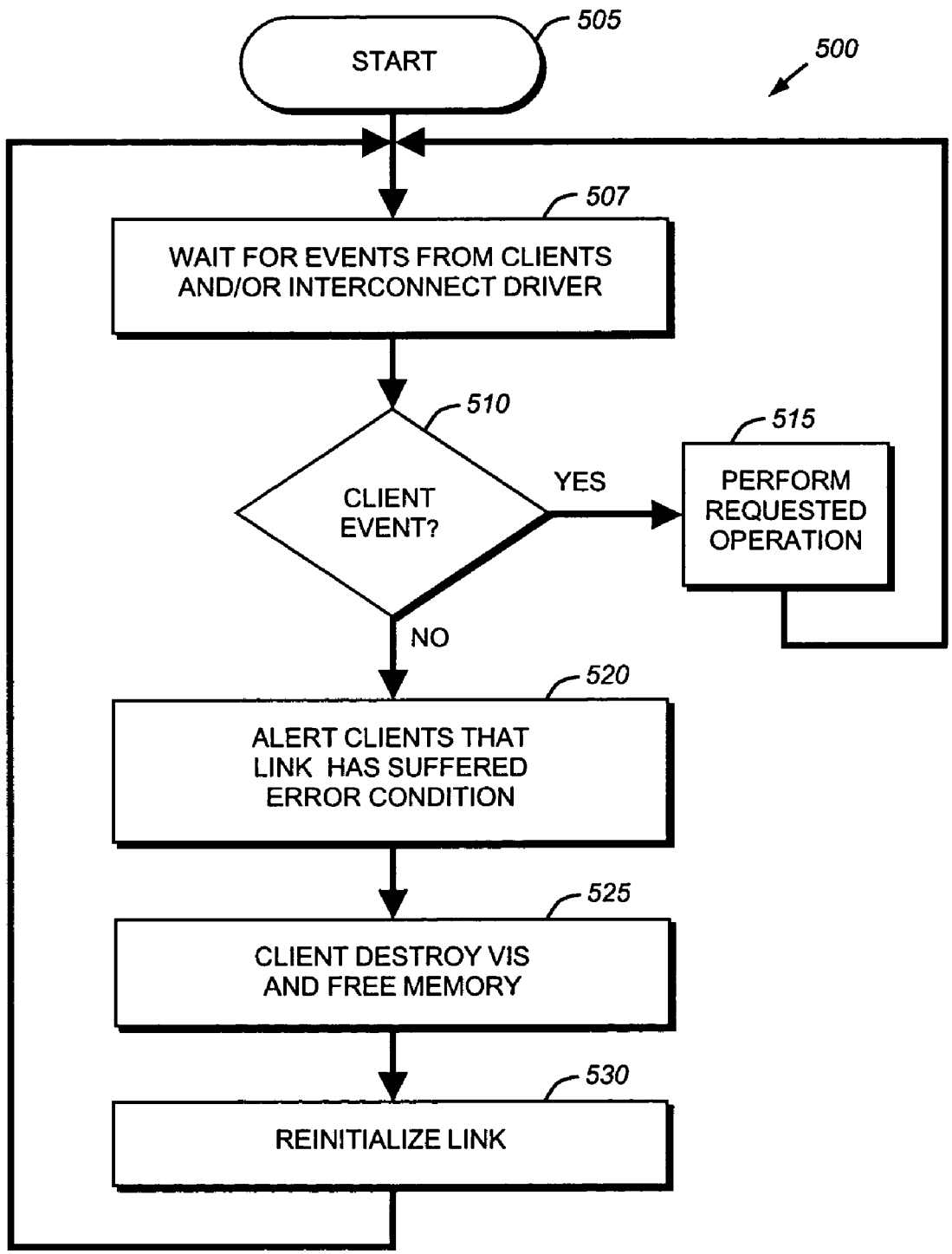
FIG. 5 is flowchart detailing the steps of a procedure performed by a cluster connection manager during operation of a cluster in accordance with an embodiment of the present invention.

FIG. 5 is a flow chart of the steps of a procedure 500 performed by the cluster connection manager once the initial communication has been initialized, for example, by the steps of procedure 400. The procedure begins in step 505 and then proceeds to step 507 where the cluster connection manager waits for events from cluster connection clients and/or cluster interconnect drivers. The cluster interconnect drivers may communicate with the cluster connection manager via an API or IPC. In alternate embodiments, the cluster connection manager monitors the status of the cluster interconnect drivers and cluster interconnect hardware by, for example, routinely polling the hardware for a status. Once an event is received, the cluster connection manager determines if it is a client-initiated event in step 510. Client-initiated events include, for example, a cluster connection client requesting an additional VI be opened, an increase of buffer space before use in RDMA operations, or an alert from a client that it no longer needs a given VI which may then be release ("freed"). If the event is a client-initiated event, the cluster connection manager performs the requested operation in step 515, before looping back to step 505 to await further events.

If the event is not a client-initiated event, then typically an error condition has occurred with the cluster interconnect media. In such a case, the cluster connection manager in step 520 alerts its clients that the interconnect has suffered an error condition and that they should cease sending messages over VIs utilizing that cluster interconnect. The cluster connection manager may alert the clients using a conventional API or IPC protocol. In response to receiving such an alert, the clients, in step 525, destroy the appropriate VIs associated with the interconnect and free any allocated memory. Once the connection clients have completed such operations, the cluster connection manager begins a cluster interconnect link re-initialization routine in step 530. The link re-initialization routine attempts to bring the cluster interconnect back to the state of "ready" operation. In the illustrative embodiment, the link re-initialization routine comprises the same steps that the storage operating system performs when initializing peer-to-peer communication with a cluster partner. This is typically accomplished using conventional VI message passing between the two cluster partners. However, an alternate method is described in the above-incorporated patent application entitled, SYSTEM AND METHOD FOR ESTABLISHING RELIABLE PEER COMMUNICATION IN A CLUSTERED ENVIRONMENT.

E. Fault Tolerance and Load Balancing

As noted above, in certain alternate embodiments, a storage system may have a plurality of cluster connection managers and/or cluster interconnect adapters. In such embodiments, the redundant cluster connection managers or cluster interconnects may be utilized by the storage system to provide fault tolerant communication paths to a cluster partner or to provide load balancing operations. For example, in the event that a cluster interconnect fails, the cluster connection manager may perform a failover operation to utilize a second cluster interconnect coupled to the cluster partner. This permits continued cluster operation in the event of a failure of a physical interconnection between the cluster partners. When utilized for load balancing, the multiple cluster interconnects may be configured so that those cluster connection clients having relatively low bandwidth requirements are associated with a first cluster interconnect and the cluster connection clients having higher bandwidth requirements are associated with a second cluster interconnect. By utilizing the plurality of cluster interconnects, system performance may be improved.

Figure 6:
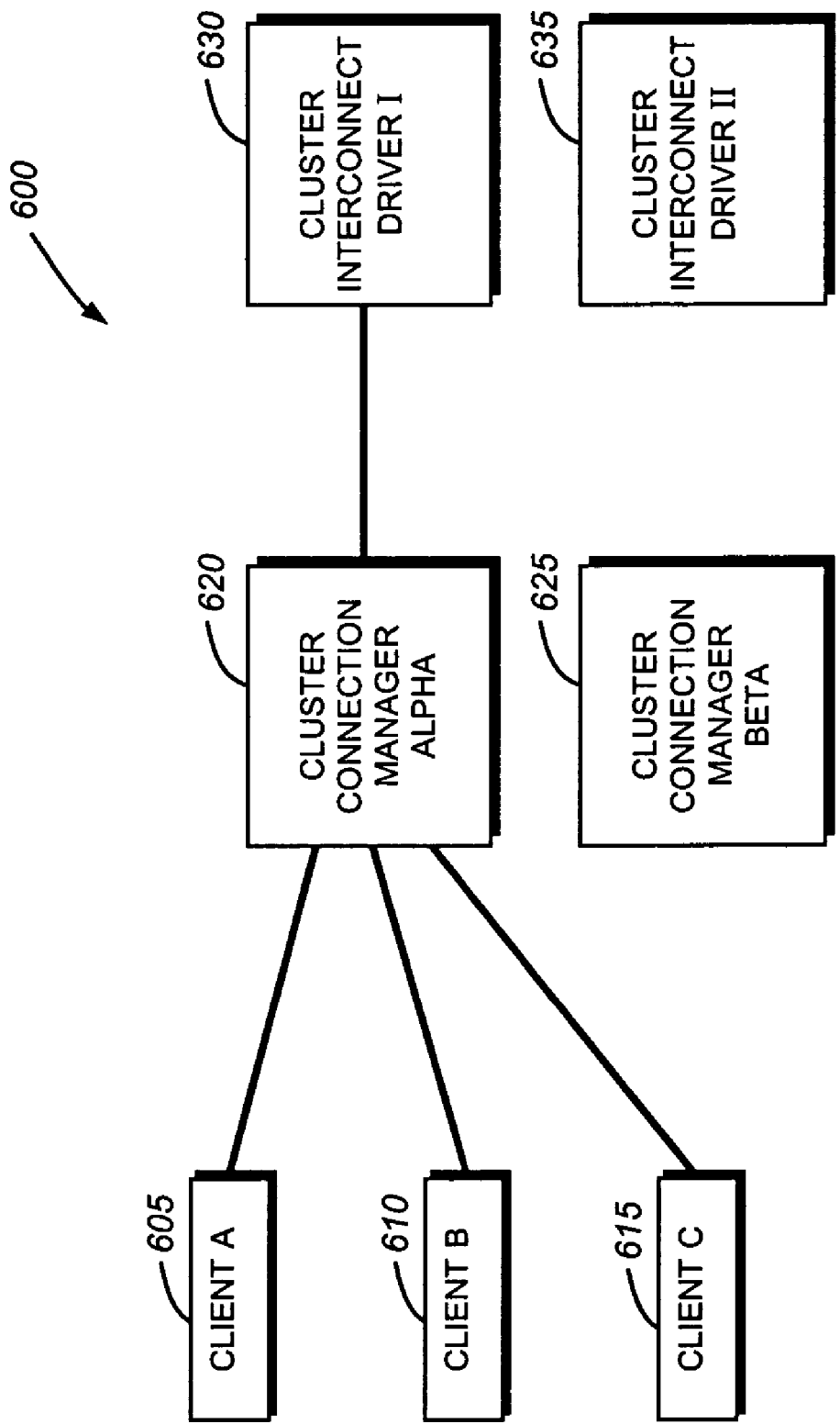
FIG. 6 is a schematic block diagram of an exemplary cluster partner environment having multiple clients, cluster connection managers and cluster interconnects in an embodiment of the present invention.

FIG. 6 is an exemplary storage system environment 600 having a plurality of cluster connection clients, cluster connection managers and cluster interconnect drivers 630, 635. Client A 605, client B 610 and client C 615 communicate with cluster connection manager Alpha 620 which, in turn, utilizes the services of cluster interconnect driver 1630. A second cluster connection manager, cluster connection manager Beta 625, is not activated or utilized by any clients.

Figure 7:
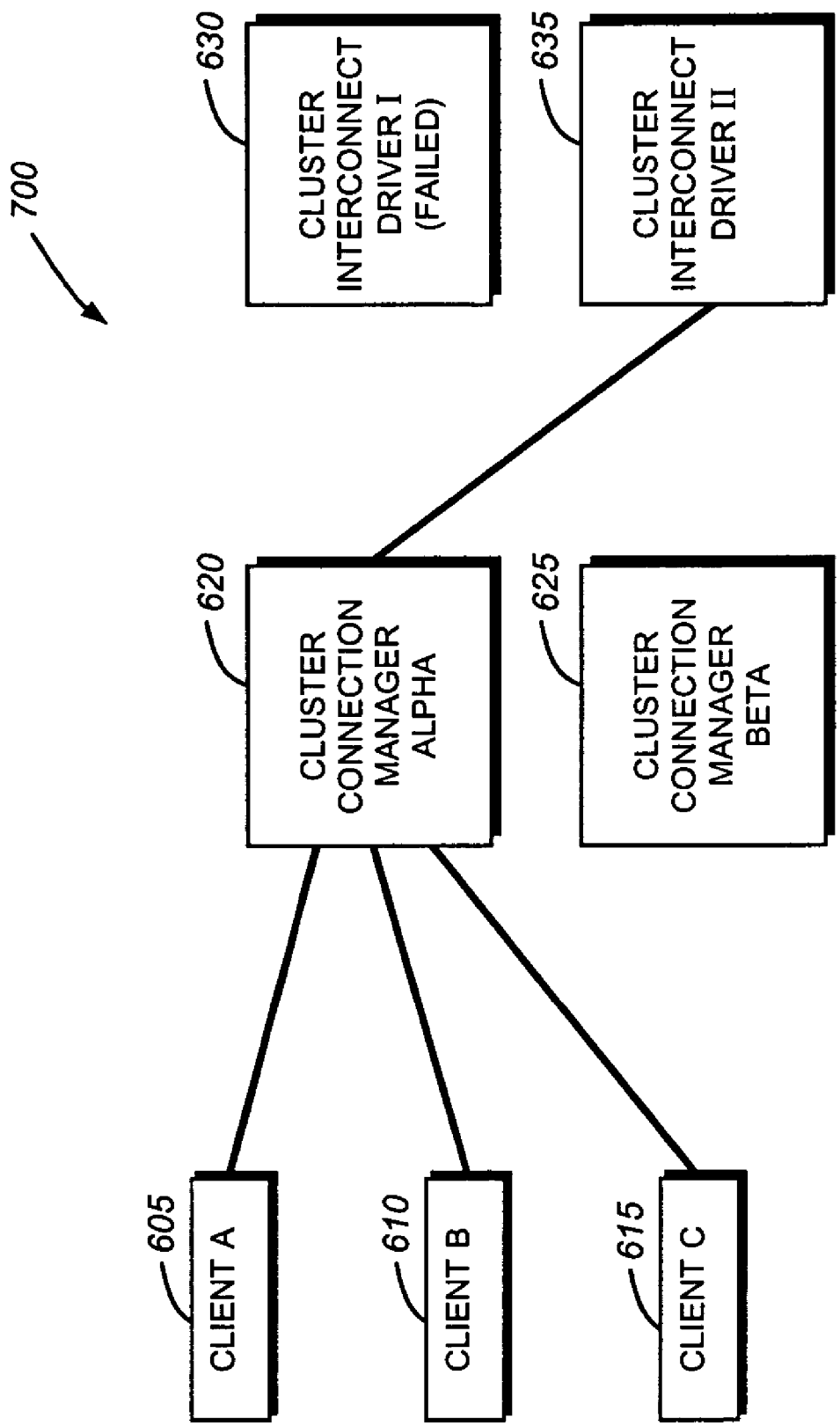
FIG. 7 is a schematic block diagram of an exemplary failover environment in accordance with an embodiment of the present invention.

If the cluster interconnect driver 630 fails, in accordance with an alternate embodiment of the invention, the cluster connection manager Alpha 620 attempts to reinitialize the appropriate links with its cluster partner. A cluster interconnect driver may fail for a variety of reasons, including for example, the failure of the associated cluster interconnect hardware adapter. The cluster connection manager 620 may, in certain embodiments, utilize cluster interconnect driver II 635 as shown in FIG. 7. In this failure environment 700, client 605, 610 and 615 are still in communication with cluster connection manager Alpha 620. However, the cluster connection manager 620 no longer utilizes the services of cluster interconnect driver 630, which has failed. Instead, the cluster connection manager 620 has begun to utilize the services of cluster interconnect II 635.

Such a failover condition could be detected by the cluster connection manager during a routine polling operation of the cluster interconnect device. If such a failover occurs, the cluster connection utilizes the second cluster interconnect device to reinitialize the desired VI connections in accordance with the re-initialization routine (step 530 of FIG. 5).

Figure 8:
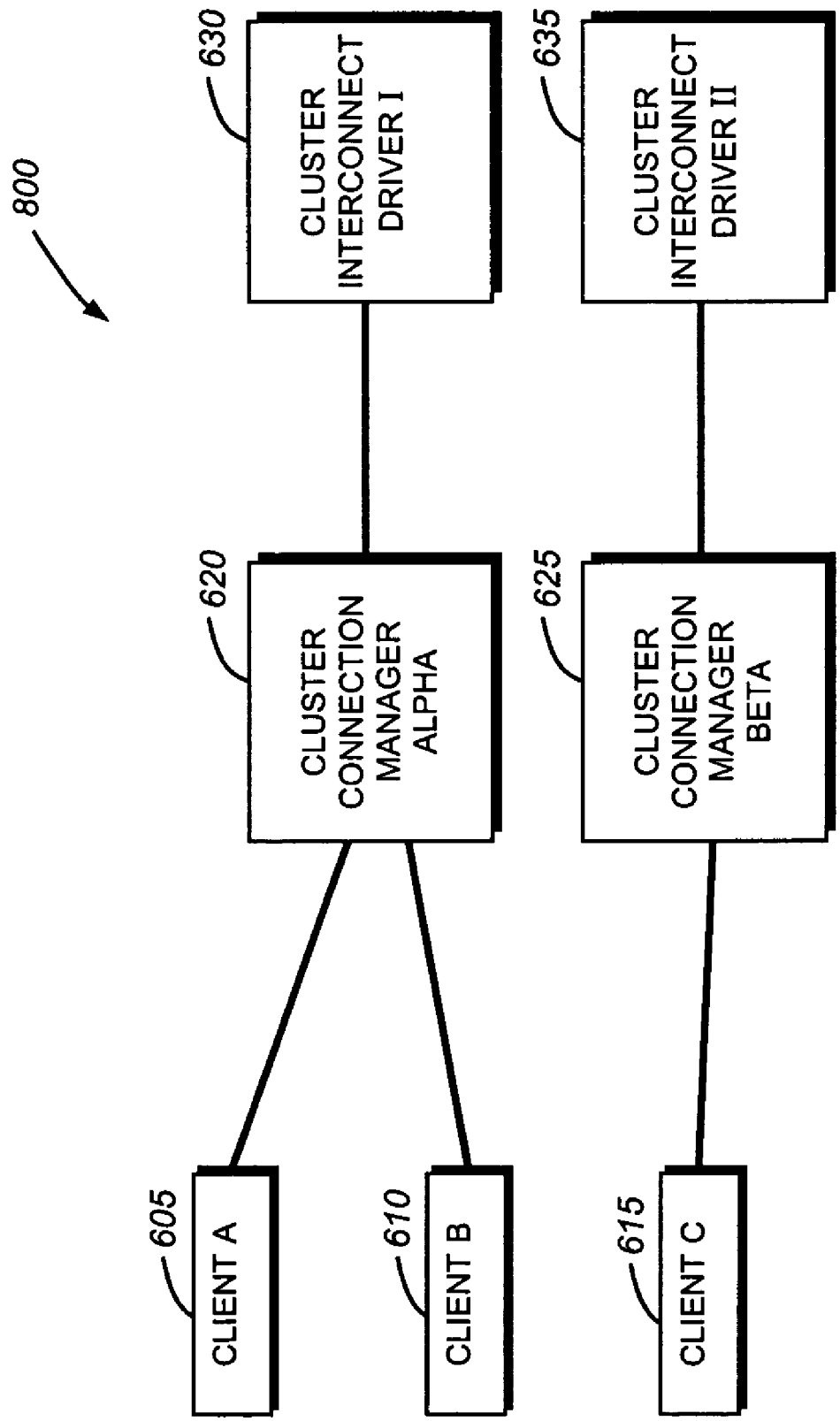
FIG. 8 is schematic block diagram of an exemplary load balancing environment in accordance with an embodiment of the present invention.

FIG. 8 shows an exemplary load balancing environment 800 utilizing a plurality of cluster connection managers and cluster interconnects. The load-balancing environment 800 includes the cluster connection manager Alpha 620 communicating with cluster interconnect driver 1630 and cluster connection manager Beta 625 communicating with cluster interconnect driver II 635. Clients A 605 and B 610 utilize the services of cluster connection manager Alpha 620, while client C 615 utilizes cluster connection manager Beta 625. If, for example, client C 615 is a NVRAM mirroring client, and there is a high-bandwidth load associated with NVRAM mirroring in the cluster 130, the environment 800 ensures that client C 615 may consume the entire bandwidth associated with cluster interconnect 635. The other clients 605 and 610 would then share the bandwidth available over cluster interconnect 630.

As can be appreciated by one skilled in the art, numerous alternative load balancing configurations may be easily created by using a plurality of cluster connection managers and cluster interconnects. Additionally, a cluster connection manager, operating in conjunction with a client, may adaptively balance the bandwidth load over a plurality of cluster interconnects in response to the client's "real time" needs. For example, if the bandwidth required by client A 605 increases such that it vastly exceeds the bandwidth required by clients 610 and 615, the cluster connection manager 620 may migrate client B 610 from the cluster interconnect 630 to the cluster interconnect 635. Such a migration provides client A 605 with the entire bandwidth available via cluster interconnect 630.

Figure 9:
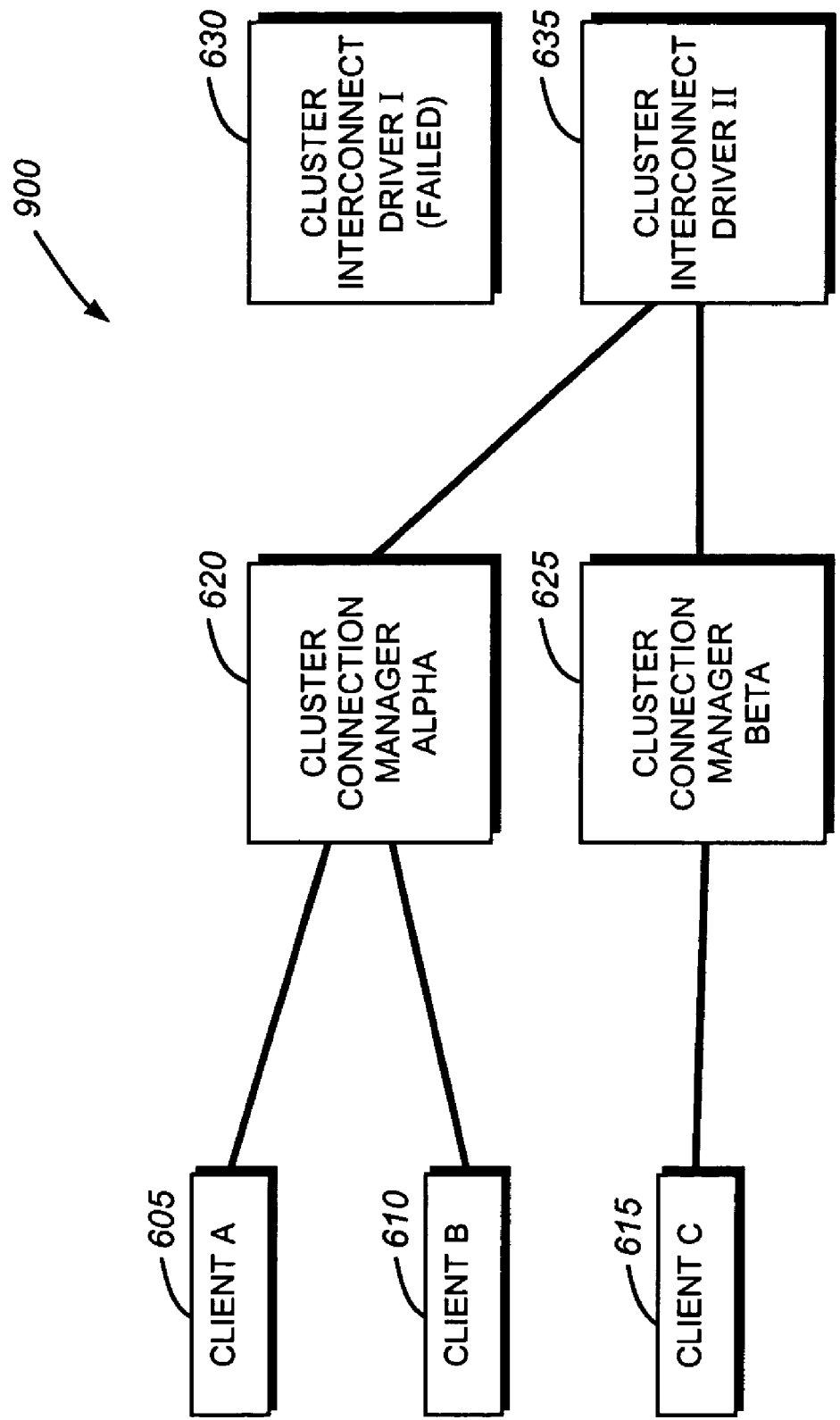
FIG. 9 is a schematic block diagram of an exemplary load balancing environment showing a failover situation in accordance with an embodiment of the present invention.

If a cluster interconnect fails during a load balancing operation, the cluster connection manager may utilize a failover routine to ensure that its cluster connection manager clients are able to properly communicate with their cluster partners. An example of such a failure condition is shown in FIG. 9. The load balanced and failover environment 900 includes a failed cluster interconnect 630. Cluster connection manager Alpha 620, which was originally communicating with cluster interconnect 1630, reinitializes its connections utilizing cluster interconnect II 635. As noted above, such a configuration adversely affects system performance due to bandwidth limitations over the cluster interconnect II's physical data link. However, data may still be transmitted and received by the cluster connection manager's clients. In alternate embodiments having more than two cluster interconnects, the cluster connection manager ideally employs the least utilized cluster interconnect for backup operation to minimize the data delays associated with a poorly load balanced system. Thus, by utilizing the fault tolerant and load balancing features of the cluster connection manager, cluster partners recognize improved system performance and reliability.

To again summarize, the present invention is directed to a system and method for providing reliable peer-to-peer communication over a cluster interconnect connecting storage systems in a clustered environment. More particularly, a novel cluster connection manager is described herein, that provides a unified management point for opening, closing and maintaining communication channels and cluster connection manager clients executing on each of the storage systems comprising a storage system cluster. The novel cluster connection manager further provides fault tolerance and load balancing capabilities to its cluster connection manager clients communicating with their cluster partners.

The foregoing description has been directed to particular embodiments of this invention. It will be apparent, however, that other variations and modifications may be made to the described embodiments, with the attainment of some or all of their advantages. It should be noted that alternative protocols, such as InfiniBand, or any other peer-to-peer protocol may be employed using the teachings of the present invention. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for initiating a peer-to-peer communication session, comprising:
   creating, using a cluster connection manager executing on a first server, an initial connection with a cluster partner on a second server;
   exchanging a set of peer connection information between the first and second servers;
   passing a set of cluster connection manager client information to the cluster partner, wherein the set of cluster connection manager client information includes at least one virtual interface and any memory requirements for a cluster manager client;
   creating a set of communication ports using the set of cluster connection manager client information, wherein the at least one virtual interface connection allows remote direct memory access (RDMA) operations that allow the cluster connection manager executing on the first server to directly access memory regions of the cluster partner operating on the second server before a storage operating system executing on the cluster partner is fully active, the RDMA read operation bypassing the operating system;
   alerting the cluster partner of a ready status; and
   alerting a set of cluster connection manager clients that the cluster partner is in a ready state.

2. The method of claim 1 wherein the set of clients comprises a failover monitor process.

3. The method of claim 1 wherein the set of peer connection information comprises a version number.

4. The method of claim 1 wherein the step of passing a set of client information to the cluster partner further comprises:
   collecting, from a set of clients, the set of client information; and
   transferring the collected set of client information to the cluster.

5. The method of claim 4 wherein the client information comprises a number of communication ports required.

6. The method of claim 4 wherein the set of client information further comprises an amount of memory requested by a particular client.

7. The method of claim 1 wherein the step of creating an initial connection further comprises using remote direct memory access primitives to create the initial connection.

8. The method of claim 1 wherein the step of creating an initial connection further comprises performing a series of remote direct memory access operations to create the initial connection.

9. A system configured to manage reliable peer communication among storage systems in a clustered environment, the system comprising:
   one or more peer processes executing on each storage system partner; and
   a cluster connection manager executing on each storage system partner, the cluster connection manager creating a set of peer-to-peer connections between the one or more peer processes executing on each storage system, wherein the cluster connection manager is provided to reliably create virtual interface connections between peer processes executing on the storage system partners over a cluster interconnect without requiring a storage operating system executing on each storage system to be fully active or functioning, wherein the virtual interface connection allows remote direct memory access (RDMA) operations that allow the cluster connection manager operating on the first server to directly access memory regions of the cluster partner operating on the second server before the storage operating system executing on the cluster partner is fully active, the RDMA read operation bypassing the operating system.

10. A computer readable medium storing executable program instructions executed by a processor, comprising:
   program instructions that create, using a cluster connection manager executing on a first server, an initial connection with a cluster partner on a second server;
   program instructions that exchange a set of peer connection information between the first server and the second server;
   program instructions that pass a set of cluster connection manager client information to the cluster partner, wherein the set of cluster connection manager client information includes at least one virtual interface and any memory requirements for a cluster manager client;
   program instructions that create a set of communication ports using the set of cluster connection manager client information, wherein the at least one virtual interface connection allows remote direct memory access (RDMA) operations that allow the cluster connection manager executing on the first server to directly access memory regions of the cluster partner operating on the second server before a storage operating system executing on the cluster partner is fully active, the RDMA read operation bypassing the operating system;
   program instructions that alert the cluster partner of a ready status; and program instructions that alert a set of cluster connection manager clients that the cluster partner is in a ready state.

* * * * *

UNITED STATES PATENT AND TRADEMARK OFFICE
CERTIFICATE OF CORRECTION

PATENT NO. : 7,716,323 B2
APPLICATION NO. : 10/622558
DATED : May 11, 2010
INVENTOR(S) : Gole et al.

Page 1 of 1

It is certified that error appears in the above-identified patent and that said Letters Patent is hereby corrected as shown below:

In the Specifications

In col. 11, line 44 should read:
the services of cluster interconnect driver ~~1630~~ 1 630. A second In col. 12, line 5 should read:
nicating with cluster interconnect driver ~~1630~~ 1 630 and cluster Signed and Sealed this
Seventeenth Day of December, 2013

Margaret A. Focarino
*Commissioner for Patents of the United States Patent and Trademark Office*